United States Patent [19]

Kuroiwa

[11] Patent Number: 4,682,094
[45] Date of Patent: Jul. 21, 1987

[54] CONTROL SYSTEM FOR A POWER CONVERTER DRIVING A SYNCHRONOUS MOTOR

[75] Inventor: Akihiko Kuroiwa, Fuchu, Japan

[73] Assignee: Kabushiki Kaisha Toshiba, Kanagawa, Japan

[21] Appl. No.: 800,769

[22] Filed: Nov. 22, 1985

[30] Foreign Application Priority Data

Nov. 27, 1984 [JP] Japan ................. 59-250106

[51] Int. Cl.$^4$ ................. H02P 5/40; H02P 5/28
[52] U.S. Cl. ................. 318/723; 318/722
[58] Field of Search ................. 318/721–723, 318/778, 798, 806; 363/138

[56] References Cited

U.S. PATENT DOCUMENTS

| | | | |
|---|---|---|---|
| 3,372,323 | 5/1968 | Guyeska | 318/803 |
| 3,696,278 | 10/1972 | Kuniyoshi | 318/778 |
| 3,769,564 | 10/1973 | Rettig | 318/803 |
| 4,088,932 | 5/1978 | Okuyama et al. | 318/138 |
| 4,246,528 | 1/1981 | Nakajima | 318/721 |
| 4,443,747 | 4/1984 | Chausse et al. | 318/723 |
| 4,460,860 | 7/1984 | Schwesig et al. | 318/721 |

OTHER PUBLICATIONS

Le-Huy et al. "Microprocessor Control of a Current-Fed Synchronous Motor Drive," Conference; Industry Applications Society IEEE-IAs Annual Meeting Cleveland, Oh. USA (Sep. 30–Oct. 4, 1979).

*Primary Examiner*—David Smith, Jr.
*Attorney, Agent, or Firm*—Schwartz, Jeffery, Schwaab, Mack, Blumenthal & Evans

[57] ABSTRACT

In a control system for a power converter driving a synchronous motor, comprising a controllable rectifier and an inverter of a load commutation type, a speed target is passed through a variation rate limiter for limiting the variation rate to produce a speed reference varied to follow the speed target but within a limited rate. A speed controller is responsive to the speed reference and the detected speed of the motor for producing a current reference. A current control circuit is responsive to the current reference and the detected current of the rectifier for adjusting the average current through the rectifier thereby to reduce the deviation of the detected speed from the speed reference. The current control means comprises means for causing intermission of the current through the rectifier for intermission commutation of the inverter when the detected speed is below a predetermined threshold. A phase angle controller is responsive to the detected rotary position of the motor and determines the firing phase angle of the inverter, and causes load commutation of the inverter when the detected speed is higher than the predetermined threshold. The speed controller resets the current reference at zero when the detected speed exceeds the predetermined threshold.

8 Claims, 11 Drawing Figures

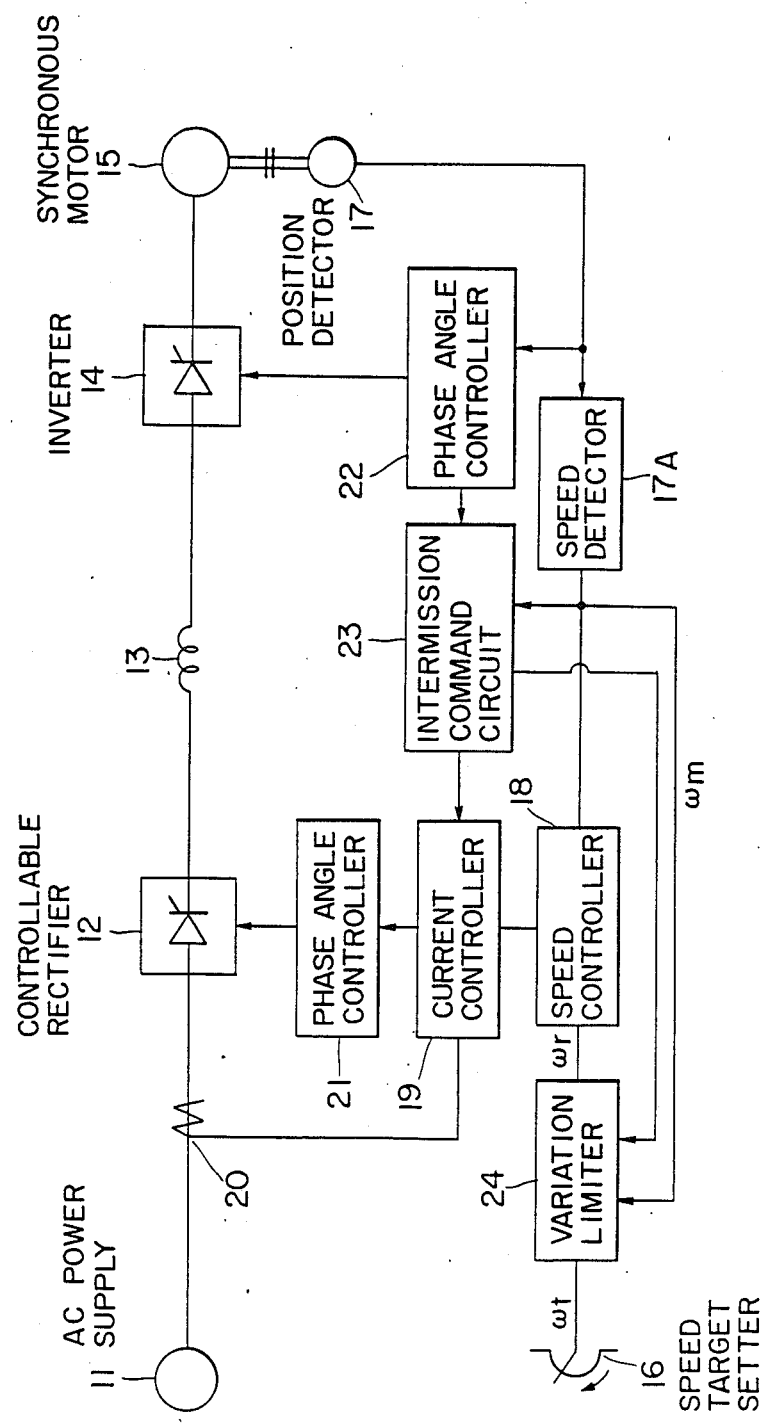
F I G. 1

PRIOR ART

1

CONTROL SYSTEM FOR A POWER CONVERTER DRIVING A SYNCHRONOUS MOTOR

BACKGROUND OF THE INVENTION

The present invention relates to a control system for a power converter driving a synchronous motor and comprising a load commuted thyristor.

Wide-spread applications are found for power converters with a load commutated thyristor inverter, which utilize back electromotive force of the synchronous motor so that the main circuitry of the inverter can be simplified, and can be designed for high tension application, and for a higher efficiency. Accordingly, they are most suitable for variable speed drive of large-capacity motors.

As was described above, the back electromotive force is utilized for commutation. But, while the motor speed is low, the back electromotive force is not sufficiently high for the commutation. Accordingly, the commutation is effected by intermission of the current supplied to the inverter. For switching between the intermission commutation and load commutation, as well as phase control of the thyristors, a control system is employed.

A conventional control system has a disadvantage in that the torque of the synchronous motor varies sharply or rapidly when there occurs a switching from the intermission commutation to the load commutation. This rapid variation in the torque may cause vibration of the mechanical system, which in turn reduces the life time of the machine.

SUMMARY OF THE INVENTION

An object of the invention is to avoid rapid change in the torque at the time of transition from the intermission commutation to the load commutation.

According to the invention, there is provided a control system for a power converter driving a synchronous motor, the power converter comprising a controllable rectifier converting an AC power into a DC power and an inverter of a load commutation type converting the DC power into an AC power of a variable frequency which is supplied to the synchronous motor, the control system comprising:

means providing a speed target;

means responsive to the speed target for limiting the variation rate to produce a speed reference varied to follow the speed target but within a limited rate;

means detecting the speed of the synchronous motor;

a speed controller responsive to the speed reference and the detected speed for producing a current reference;

current control means responsive to the current reference and the detected current for adjusting the average current through the rectifier thereby to reduce the deviation of the detected speed from the speed-reference, the current control means comprising means for causing intermission of the current through the rectifier for intermission commutation of the inverter when the detected speed is below a predetermined threshold;

means detecting the rotary position of the synchronous motor, and means responsive to the detected rotary position for determining the firing phase angle of the inverter, and causing load commutation of the inverter when the detected speed is higher than the predetermined threshold, the speed controller resetting the current reference at zero when the detected speed exceeds the predetermined threshold.

BRIEF DESCRIPTION OF THE DRAWINGS

In the accompanying drawings:

FIG. 1 is a block diagram showing an embodiment of the control system of the invention;

DETAILED DESCRIPTION OF THE EMBODIMENTS

Figure 2:
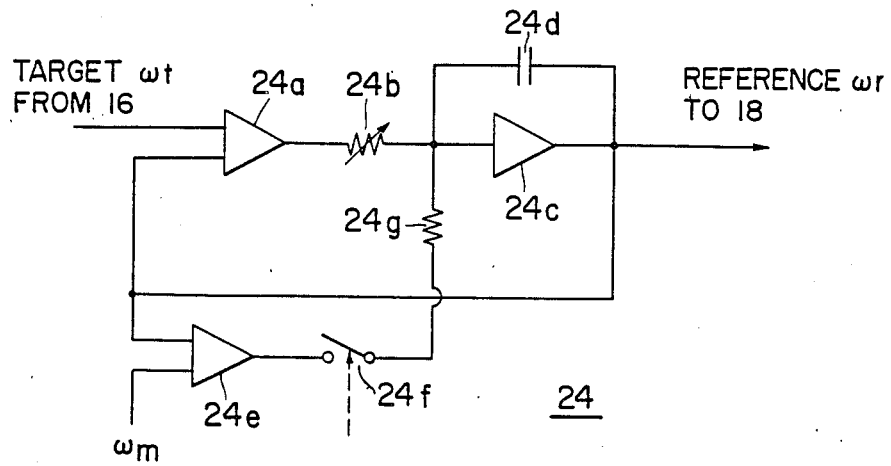
FIG. 2 is a circuit diagram showing an example of a variation rate limiter shown in FIG. 1.

Referring now more particularly to FIG. 1, there is shown an embodiment of the invention. In FIG. 1, an AC power from AC power supply 11 is converted by a controllable rectifier 12 into a DC power, which is smoothed by a DC reactor 13, and then converted by an inverter 14 into an AC power with a variable frequency. The rectifier 12, the DC reactor 13 and the inverter 14 form a power converter for driving a synchronous motor 15 with a variable speed.

A speed target setter 16 produces a speed target, which is adjustable. The speed target represents value to which the motor speed should be varied. For instance, when the motor is started and it is desired to incresae the motor speed to the rated speed, the speed target is changed stepwise from zero to the rated speed.

A variation rate limiter 24 receives the speed target and limits the variation rate to produce a speed reference varied to follow the speed target but within the limited rate. For instance, when the target value is changed stepwise, the speed reference is changed gradually at the limited rate until it reaches the new target value.

An example of the variation rate limiter 24 is shown in FIG. 2. As shown, it comprises a comparator 24a comparing the speed target $\omega_t$ and the speed reference $\omega_r$ and producing a signal of a certain level when the former is greater than the latter, a variable resistor 24b adjusted to vary the limit rate, an operational amplifier 24c with a capacitor 24d forming an integrator, another comparator 24e comparing the speed reference $\omega_r$ and the detected speed $\omega_m$ and producing a signal of a certain level if the former is greater than the latter, a switch 24f and a current limiting resistor 24g of a low resistance. When the output of the comparator 24e is at the above-mentioned "certain level" and if the switch 24f is closed, the capacitor 24d is rapidly discharged until the reference $\omega_r$ becomes equal to $\omega_m$.

Figure 3:
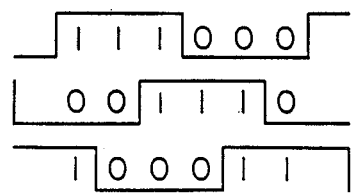
FIG. 3 is a time chart showing the output of the position detector shown in FIG. 1.

A position detector 17 detects the rotational position of the magnetic field of the synchronous motor 15. An example of the position detector produces a set of three-phase logic signals, shown in FIG. 3, 120° apart from each other, the combination of which, a three-bit signal, varies every 60°.

A speed detector 17A receives the signals from the position detector 17 and determines the speed of the motor 15. The determination of the speed can be made for example by measuring the frequency at which the three-bit signal varies in value.

A speed controller 18 receives the speed reference $\omega_r$ and the detected speed $\omega_m$ from the speed detector 17A and produces a current reference I*.

Figure 4:
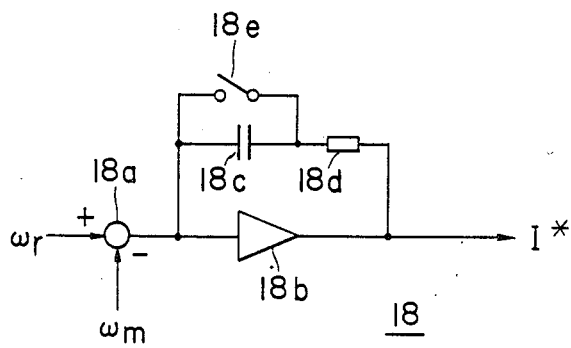
FIG. 4 is a circuit diagram showing an example of a speed controller shown in FIG. 1.

An example of the speed controller 18 is shown in FIG. 4. As illustrated, it comprises an adder 18a determining the difference between the speed reference $\omega_r$ and the detected speed $\omega_m$, an operational amplifier 18b with a first order lag element comprising a series connection of a capacitor 18c and a resistor 18d, and a switch 18e connected across the capacitor 18c.

A phase angle controller 22 receives the position-indicating three-bit signal from the position detector 17 and controls the firing angle of the thyristors of the inverter 14. The phase angle controller 22 also supplies a signal used for intermission commutation in a current controller 19, to be described later.

An intermission command circuit 23 receives the detected speed $\omega_m$ from the speed detector 17A and produces an intermission signal used for intermission of the current of the rectifier when the detected speed is below a predetermined threshold, which may be set for example at 10% or less of the rated speed.

A current detector 20 detects the current of the rectifier 12.

The current controller 19 operates in either of a first or a second mode. In the first mode, the current controller 19 is responsive to the current reference I* from the speed controller 18 and the detected current I from the current detector 20 and determines a phase reference $\theta^*$, and continuously produces this phase reference $\theta^*$. In the second mode, the current controller 19 determines the phase reference $\theta^*$ in a similar manner but intermittently produces this phase reference $\theta^*$. A phase angle controller 21 is responsive to the phase reference $\theta^*$ for controlling the firing angle of the arms of the rectifier 12 thereby to adjust the DC power outputted from the rectifier 12. In the second mode, the rectifier 12 is intermittently made conductive; that is, while the phase reference $\theta^*$ is interrupted, the rectifier 12 is kept non-conductive.

Figure 5:
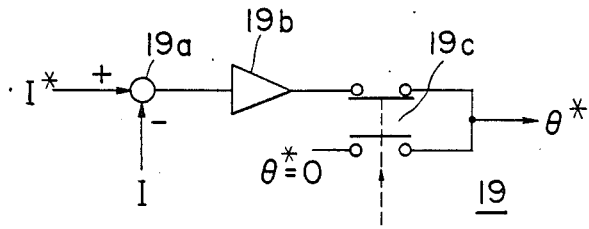
FIG. 5 is a circuit diagram showing an example of a current controller shown in FIG. 1.

An example of the current controller 19 is shown in FIG. 5. As illustrated, it comprises an adder 19a determining the difference between the current reference I* and the detected current I, an operational amplifier 19b, and a selector 19c. The selector 19c normally selects the output of the amplifier 19b. When the phase reference $\theta^*$ is to be intermitted, the selector 19c is made to select alternately the output of the amplifier 19b and a preset value for making the phase reference $\theta^*$ zero. The operation of the switch 19c is controlled by an intermittent signal from the intermission command circuit 23.

Increase in the current of the rectifier 12 generally tends to increase the torque and hence the speed of the motor 15. Decrease in the current of the rectifier 12 generally tends to decrease the torque and hence the speed of the motor 15.

While the power converter is operating in the loadcommutation mode, the phase angle controller 22 controls the firing phase angle for loadcommutation.

As was described, while the speed of the motor 15 is low, the back electromotive force is low, so that loadcommutation cannot be made. Accordingly, the current of the rectifier 12 is made to be zero every time the inverter 14 is to be commutated.

Figure 6A:
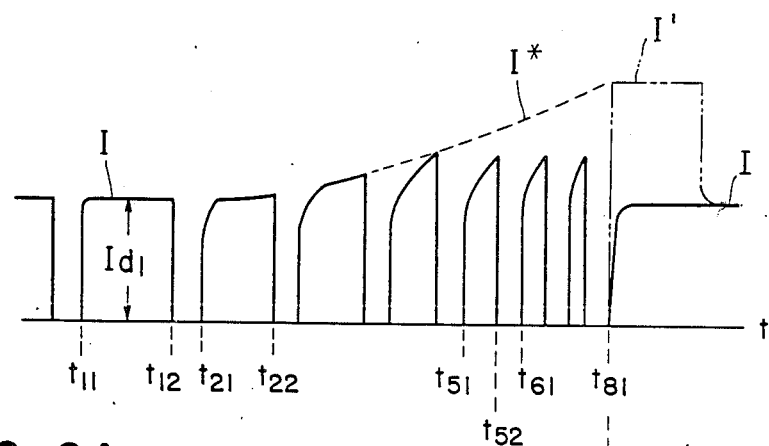
FIGS. 6A and 6B are time charts showing the current through a reactor and the torque of a synchronous motor.
Figure 6B:
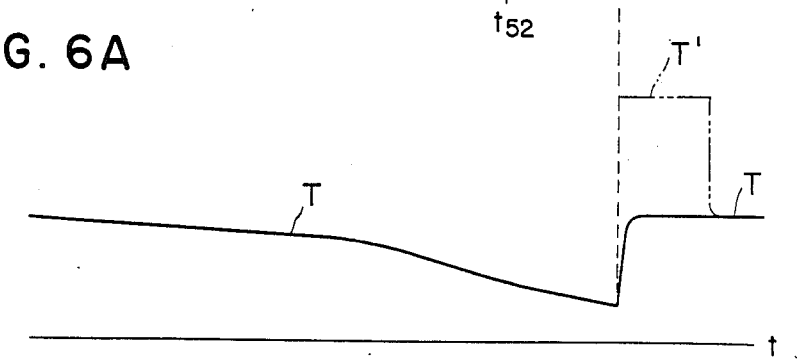

The current which flows through the reactor 13 during the intermission start operation, is shown in FIG. 6A, while FIG. 6B shows the torque of the motor 15 during such intermission start operation. As illustrated, a DC current $I_{d1}$ is made to flow from the instant $t_{11}$ to the instant $t_{12}$. The DC current is kept at zero from $t_{12}$ to $t_{21}$. Similarly, a DC current $I_{d1}$ is made to from $t_{12}$ to $t_{22}$, ... from $t_{51}$ to $t_{52}$, while the DC current is interrupted from $t_{12}$ to $t_{21}$ ... $t_{52}$ to $t_{61}$.

The time period (i.e., OFF period) $t_{12}$ to $t_{21}$ ... $t_{52}$ to $t_{61}$ for which the current is interrupted is set at a little longer than the turn-off time of the arms of the inverter 14 and is fixed regardless of the motor speed.

Figure 7A:
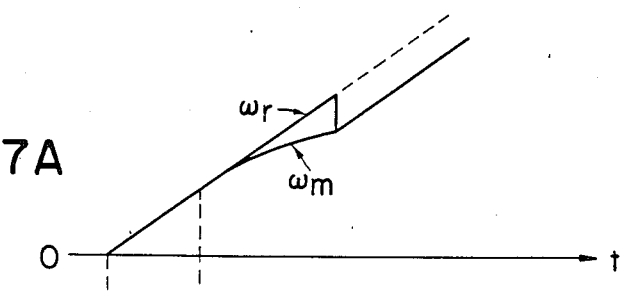
FIGS. 7A and 7B are time charts showing the speed and the torque of a synchronous motor.

If the magnitude of the current during the ON period (for which the current is allowed to flow through the rectifier) were unchanged, the average of the current over the ON period and the OFF period and hence the average torque would be decreased with increased speed. To avoid and counteract the decrease of the average current and the torque, the reference I* of the current is increased as shown by a dotted line. When the motor speed is very low, the interval between successive interruption (for commutation) is sufficiently long so that the effect of the current interruption on the torque is negligible. But when the motor speed becomes higher (approaching the speed threshold for switching from the intermission commutation to the loadcommutation) the ON period becomes so short that the current does not reach the reference value I* during the ON period. This is because the rising rate is limited by the reactor 13. As a result, the average current and hence the torque become smaller, and the motor becomes incapable of following the speed reference, so that the motor speed becomes lower than the speed reference $\omega_r$ and the speed deviation becomes greater, as shown in FIG. 7A and FIG. 8A.

When the motor speed reaches the threshold value for switching the commutation mode, then there occurs a switching from the intermission commutation to the loadcommutation. As a result, the DC current through the reactor 13 will thereafter become continuous. The torque will then become sufficient to follow the speed reference.

Figure 8A:
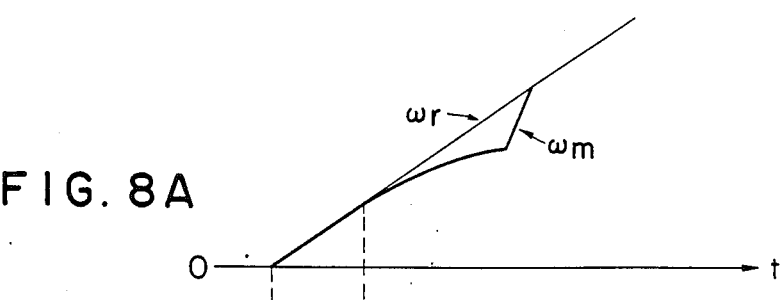
FIGS. 8A and 8B are time charts showing the speed and the torque of a synchronous motor driven by a power converter with a conventional control system.
Figure 8B:
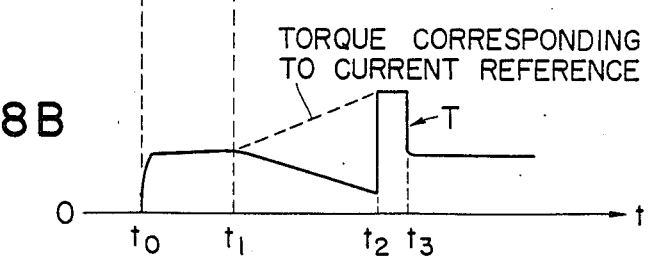

If no special means were provided, the motor speed is made to increase rapidly to catch up with the speed reference as shown in FIG. 8A so that there occurs a rapid change in the torque as shown in FIG. 8B. This may cause mechanical vibration of the mechanical system, the coupling and the like. The life time of the mechanical system may therefore be reduced.

To solve these problems, the system of the invention is provided with means for resetting at zero the current reference as outputted from the speed controller, when the commutation mode is switched. More particularly, switch 18e of the speed controller 18 and the switch 24f of the variation rate limiter 24 are closed. The closure of the switch 18e will clear the integral component of the P-I (proportional plus integral) speed controller 18. Upon clearance of the integral the switch 18e is re-opened and hence the integration is re-started. This means that the effect of the integral, up to the switching, of the deviation of the detected speed $\omega_m$ from the speed reference $\omega_r$ on the subsequent control operation is nullified, and the subsequent control is effected as if there had been no deviation.

The closure of the switch 24f will rapidly decrease the speed reference $\omega_r$ to be equal to the detected speed $\omega_m$. The speed reference $\omega_r$ is thereafter increased with the limited rate, as shown in FIG. 7A.

Figure 7B:
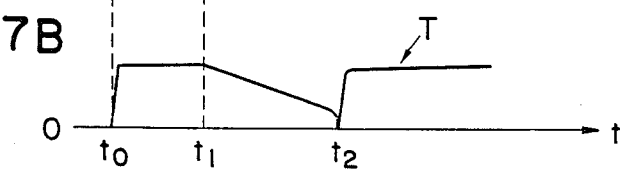

The torque is suppressed to a value corresponding to the limited rate of increase in the speed, as shown in FIG. 7B and also in FIG. 6B. This is because the integral of the deviation is cleared. Moreover, the rapid change in the torque is avoided. This is because the current reference I* as outputted from the speed controller 18 is once set at zero and is then increased, and hence the actual current is therefore increased from zero. If the switches 18e and 24e and the operational amplifier 24e were not provided, the current would be as shown by chain line I' (FIG. 6A), which would cause the rapid variation in the torque T' in FIG. 6B, causing the problematical vibration.

As has been described, the invention avoids generation of an excessive torque and hence achieves smooth switching between the two commutation modes.

In the embodiment described, the speed reference $\omega_r$ is set at the detected actual speed $\omega_m$ at the time of the switching. But if the actual speed at the time of switching is known, i.e., it is the predetermined threshold, then the arrangement may alternatively be such that the speed reference is set at the known value, e.g., the predetermined threshold.

What is claimed is;

1. A method of controlling a power converter driving a synchronous motor, said power converter comprising a controllable rectifier converting an AC power into a DC power and an inverter of a load commutation type converting the DC power into an AC power of a variable frequency which is supplied to said synchronous motor, said method comprising the steps of:
   providing a speed target;
   providing a speed reference in accordance with the speed target, the speed reference being varied to follow the speed target but within a variation rate;
   detecting the speed of the synchronous motor;
   producing, by use of a speed controller, a current reference in accordance with the speed reference and the detected speed;
   detecting the current of said rectifier;
   adjusting the average current through the rectifier in accordance with the current reference and the detected current thereby to reduce the deviation of the detected speed from the speed reference;
   detecting the rotary position of the synchronous motor;
   determining the firing phase angle of the inverter in accordance with the detected rotary position;
   causing intermission of the current through the rectifier for intermission commutation of the inverter when the detected speed is below a predetermined threshold;
   resetting the current reference at zero and the speed reference at the actual speed when the detected speed exceeds said predetermined threshold; and
   causing load commutation of the inverter when said detected speed is higher than said predetermined threshold.

2. A method according to claim 1, wherein said actual speed is said detected speed as detected by said speed detecting means.

3. A control system for a power converter driving a synchronous motor, said power converter comprising a controllable rectifier converting an AC power into a DC power and an inverter of a load commutation type converting the DC power into an AC power of a variable frequency which is supplied to said synchronous motor, said control system comprising:
   means for providing a speed target;
   means responsive to the speed target for limiting the variation rate to produce a speed reference varied to follow the speed target but within a limited rate;
   means, connected to said variation rate limiter, for detecting the speed of the synchronous motor;
   a speed controller responsive to the speed reference and the detected speed for producing a current reference;
   means, connected to said rectifier, for detecting the current of said rectifier;
   current control means responsive to the current reference and the detected current for adjusting the average current through the rectifier thereby to reduce the deviation of the detected speed from the speed reference, the current control means comprising means for causing intermission of the current through the rectifier for intermission commutation of the inverter when the detected speed is below a predetermined threshold;
   said speed controller resetting the current reference at zero when the detected speed exceeds said predetermined threshold;
   said variation rate limiter resetting its output at the actual speed when said detected speed exceeds said predetermined threshold;
   means, connected to the synchronous motor, for detecting the rotary position of the synchronous motor; and
   means responsive to the detected rotary position for determining the firing phase angle of the inverter, causing load commutation of the inverter when said detected speed is higher than said predetermined threshold.

4. A system according to claim 3, wherein said actual speed is said detected speed as detected by said speed detecting means.

5. A method of controlling a power converter driving a synchronous motor, said power converter comprising a controllable rectifier converting an AC power into a DC power and an inverter of a load commutation type converting the DC power into an AC power of a variable frequency which is supplied to said synchronous motor, said method comprising the steps of:
   providing a speed target;
   providing a speed reference in accordance with the speed target, the speed reference being varied to follow the speed target but within a variation rate;
   detecting the speed of the synchronous motor;
   providing a speed controller carrying out a proportional plus integral control action by inputting the difference between the speed reference and the detected speed;
   producing, by use of the speed controller, a current reference through the proportional plus integral control action in accordance with a difference between the speed reference and the detected speed;
   detecting the current of said rectifier;
   adjusting the average current through the rectifier in accordance with the current reference and the detected current thereby to reduce the deviation of the detected speed from the speed reference;

detecting the rotary position of the synchronous motor;

determining the firing phase angle of the inverter in accordance with the detected rotary position;

causing intermission of the current through the rectifier for intermission commutation of the inverter when the detected speed is below a predetermined threshold;

resetting the current reference at zero by clearing an integral component in said speed controller when the detected speed exceeds said predetermined threshold; and causing load commutation of the inverter when said detected speed is higher than said predetermined threshold.

6. A method according to claim 5, wherein said speed controller comprises an adder determining the difference between the speed reference and the detected speed, an operational amplifier receiving the difference, and a first order lag element connected to the operational amplifier in parallel, said lag element comprises a series connection of a capacitor and a resistor, and said step of clearing comprises discharging the capacitor when the detected speed exceeds said predetermined threshold.

7. A control system for a power converter driving a synchronous motor, said power converter comprising a controllable rectifier converting an AC power into a DC power and an inverter of a load commutation type converting the DC power into an AC power of a variable frequency which is supplied to said synchronous motor, said control system comprising:

means for providing a speed target;

means responsive to the speed target for limiting the variation rate to produce a speed reference varied to follow the speed target but within a limited rate;

means, connected to said variation rate limiter, for detecting the speed of the synchronous motor;

a speed controller for producing a current reference which carries out a proportional plus integral control action by inputting the difference between the speed reference and the detected speed and outputting the current reference, and including means for clearing an integral component in said controller so as to reset the current reference at zero when the detected speed exceeds said predetermined threshold;

means, connected to said rectifier, for detecting the current of said rectifier;

current control means, responsive to the current reference and the detected current, for adjusting the average current through the rectifier thereby to reduce the deviation of the detected speed from the speed reference, the current control means comprising means for causing intermission of the current through the rectifier for intermission commutation of the inverter when the detected speed is below a predetermined threshold;

means, connected to the synchronous motor, for detecting the rotary position of the synchronous motor; and means responsive to the detected rotary position for determining the firing phase angle of the inverter, and causing load commutation of the inverter when said detected speed is higher than said predetermined threshold.

8. A system according to claim 7, wherein said speed controller comprises an adder determining the difference between the speed reference and detected speed, an operational amplifier receiving the difference, and a first order lag element connected to the operational amplifier in parallel, said lag element comprises a series connection of a capacitor and a resistor, and said clearing means comprises a switch connected across the capacitor and momentarily closed when the detected speed exceeds said predetermined threshold.

* * * * *